(No Model.)
C. P. GOERZ & E. VON HÖEGH.
LENS FOR OPTICAL PURPOSES.
No. 528,155.   Patented Oct. 30, 1894.
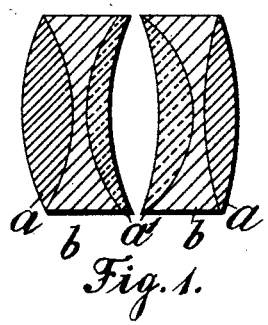
Fig. 1.
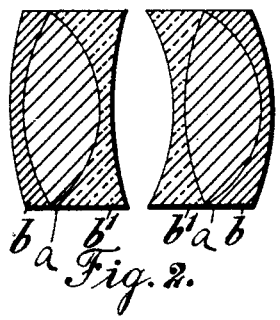
Fig. 2.
Fig. 3
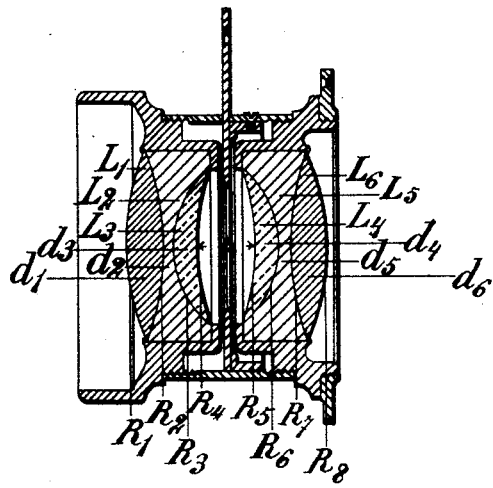
Witnesses:
H. G. Dieterich
M. G. L. Higgins
Inventors:
Carl P. Goerz and
Emil von Höegh.
by —— Atty.

UNITED STATES PATENT OFFICE.

CARL PAUL GOERZ, OF SCHÖNEBERG, AND EMIL VON HÖEGH, OF WILMERSDORF, GERMANY.

LENS FOR OPTICAL PURPOSES.

SPECIFICATION forming part of Letters Patent No. 528,155, dated October 30, 1894.

Application filed February 11, 1893. Serial No. 461,972. (No model.)

*To all whom it may concern:*

Be it known that we, CARL PAUL GOERZ, of Schöneberg, and EMIL VON HÖEGH, of Wilmersdorf, Germany, both subjects of the King of Prussia, German Emperor, have invented certain new and useful Improvements in and Relating to Lenses for Optical Purposes; and we do hereby declare the following to be a full, clear, and exact description of the invention.

Our invention has relation to lenses for optical purposes and more especially to objectives for photographic purposes.

Our invention has for its object the production of a lens free from chromatic, spherical and astigmatic aberrations, and the combination of two such lenses for photographic purposes, as will now be fully described, reference being had to the accompanying drawings, in which—

Figures 1 and 2 are sectional views of compound lenses constructed according to our invention. Fig. 3 shows a double objective for photographic purposes embodying two compound lenses of the form shown in Fig. 1.

It has for a long time been held by the highest scientific authorities that it is impossible to construct a lens that is free from chromatic, spherical and astigmatic aberrations, and this opinion was based upon the fact that a lens free from astigmatic and chromatic aberrations must be composed of two lenses of different refracting power, that of the flint glass lens being less than that of the crown glass lens, rendering it impossible to correct spherical aberrations to effect which the flint glass lens must have a greater refracting power than the crown glass lens, and it has been held that these antagonistic or opposing requirements constituted an insuperable difficulty to the production of a lens that is free from chromatic, spherical and astigmatic aberrations. In fact it is well known that all anastigmatic lenses heretofore produced, as for instance those constructed according to the invention of Hartnack are not free from spherical aberrations and are therefore practically useless for general photographic purposes, and particularly for instantaneous photography. Dr. P. Rudolph, of Jena, in his patent granted to him in Germany under date of April 3, 1890, No. 56,109, has, however indicated the possibility of producing astigmatic lenses free, or substantially free from spherical aberrations, but in a manner radically different from that which forms the subject matter of our invention, and which is the result not only of a careful study of the subject and extensive computations, but also of extensive experiments, which finally resulted in a compound lens composed of three lenses whereof one has a greater and the other a less refracting power than the third, practically free from chromatic, spherical and astigmatic aberrations, and in the combination of two such compound lenses in the production of a double objective for photography.

The compound lens may be constructed in different ways, in fact the external form may be considered as a minor factor in that it does not constitute the essential characteristic feature of the lens, said essential characteristic feature consisting in the combination of three lenses, whereof one has a greater and another a less refracting power than the third lens.

In Fig. 1 we have shown a compound lens composed of a negative lens, $b$, of flint glass interposed between two positive lenses, $a, a'$, of crown glass, one of said crown glass lenses having a greater and the other a less refracting power than the intermediate flint glass lens.

In Fig. 2, on the contrary, we have shown the compound lens composed of a positive lens, $a$, of crown glass interposed between two negative lenses of flint glass, one of said negative lenses having a greater and the other a less refracting power than the interposed crown glass lens. In this manner we combine the antagonistic requirements of a less and a greater refracting power for the correction of spherical aberrations, and a greater and less refracting power for the correction of astigmatic aberrations, the result of which is an achromatic and anastigmatic lens free from spherical aberrations, admirably adapted for photographic purposes.

We have discovered that by combining two such compound lenses a double objective for photographic purposes is obtained that is not only adapted for general photographic purposes but particularly for instantaneous photography, and in Fig. 3 we have shown this double objective composed of two compound lenses of the construction shown in Fig. 1. Equally good results are obtained if the objective be composed of two lenses of the construction shown in Fig. 2, or if said objective be composed of a compound lens of the construction shown in Fig. 1, and a compound lens of the construction shown in Fig. 2.

We prefer the construction of lens shown in Fig. 1, on the ground that the form of the individual lenses is more simple and practical, not that better results are obtained, as experience has shown that there is no appreciable difference in the quality of the two constructions of compound lenses or in their properties.

The constants necessary to the construction of the double objective shown in Fig. 3 are given in the table below in millimeters, the focal length or distance of the objective being two hundred and forty millimeters with a free lens opening of thirty-six millimeters, the greatest effective area or opening being about one-eighth of the focal length or distance.

| Curvature radii. | Thickness of lenses. | Species of glass. | |
|---|---|---|---|
| | | $^nD$ | $^nG1$ |
| $R_1=-R_8=45.835$ | $d_1=d_6=7.334$ | | |
| $R_2=-R_7=54.324$ | $d_2=d_5=1.833$ | $L_1=L_6: 1.61310$ | $1.62683$ |
| $R_3=-R_4=19.853$ | $d_3=d_4=4.584$ | $L_2=L_5: 1.56804$ | $1.58182$ |
| $R_4=-R_5=49.088$ | $\Delta=11$ (air space) | $L_3=L_4: 1.51497$ | $1.52663$ |

The different kinds or species of glass of which the lenses are made are indicated by the refracting exponents for the line D ($^nD$) of the solar spectrum and for the line of the hydrogen spectrum, $H_8$ ($^nG_1$).

The conjunctive distances (F) of light rays passing through the various zones of the objective parallel to its axis are obtained by the following computations:

for the central rays $\begin{cases} FG_1 = 223.065 \\ FD = 223.275 \end{cases} \Delta = -0.210$ for the middle zone $\begin{cases} FG_1 = 221.400 \\ FD = 221.360 \end{cases} \Delta = +0.040$ for the edge zone $\begin{cases} FG_1 = 223.495 \\ FD = 223.442 \end{cases} \Delta = +0.053$ If a main ray of light inclined to an angle of thirty degrees and passing through the system of lenses is calculated and the location of the image point of the sagittal and meridional rays established or determined thereon, the distance between said points will give the measure of astigmatic aberration still present. In the double objective referred to this will be about 1.2 millimeters with an approximate evenness of the image of the meridional rays, but this slight astigmatic aberration cannot have any greater influence upon the clearness or sharpness of the edges of the image than the secondary spherical aberration to which it is due.

The above described objective is symmetrically constructed. It is composed of two exactly similar compound lenses, which, however, is not to be considered as the primary or most essential characteristic feature of this type of objective, said essential characteristic feature lying in the combination of two lenses free from chromatic, spherical and astigmatic aberrations each of which is composed of three lenses having varying refracting powers as described. In the combination of two compound lenses for double objectives, the external form of one of said compound lenses may differ from that of the other, that is to say one of the compound lenses may, for instance, be constructed as described in reference to Fig. 1, and the other as described in reference to Fig. 2, and such changes of form may be readily effected by any skilled optician. Furthermore, each compound lens of the double objective is in itself an objective free from chromatic, spherical and astigmatic aberrations, and can therefore be employed as an objective for photographic purposes.

Having thus described our invention, what we claim as new therein, and desire to secure by Letters Patent, is—

1. In an objective, a compound lens consisting of three single lenses the outer ones of which have a greater and less refractive power respectively than the intermediate lens, said intermediate lens having its surfaces curved in opposite directions and said outer lenses having their outer surfaces curved in the same direction, for the purpose set forth.

2. An objective consisting of two compound lenses each composed of three single lenses, the outer ones of which have a greater and less refractive power respectively than the intermediate lens, said intermediate lens having its surfaces curved in opposite directions, and said outer lenses having their outer surfaces curved in the same direction, for the purpose set forth.

In witness whereof we affix our signatures in presence of two witnesses.

CARL PAUL GOERZ.
EMIL VON HÖEGH.

Witnesses:
RICHARD SCHMIDT,
RICHARD JONSCHER.